(12) United States Patent
Kanungo et al.

(10) Patent No.: US 10,819,688 B2
(45) Date of Patent: Oct. 27, 2020

(54) SYSTEM AND METHOD FOR GENERATING AND MANAGING A KEY PACKAGE

(71) Applicant: Tala Secure, Inc., Mountain View, CA (US)

(72) Inventors: Rajesh Kanungo, Mountain View, CA (US); Rampura Venkatachar Raman, Bangalore (IN); Benjamin R. Loomis, Sunnyvale, CA (US)

( * ) Notice: Subject to any disclaimer, the term of this patent is extended or adjusted under 35 U.S.C. 154(b) by 278 days.

(21) Appl. No.: 15/934,971

(22) Filed: Mar. 24, 2018

(65) Prior Publication Data

US 2019/0297065 A1 Sep. 26, 2019

(51) Int. Cl.
*H04L 29/06* (2006.01)
*H04L 9/08* (2006.01)
*H04L 9/32* (2006.01)

(52) U.S. Cl.
CPC .......... *H04L 63/062* (2013.01); *H04L 9/0861* (2013.01); *H04L 9/0894* (2013.01); *H04L 9/3247* (2013.01); *H04L 63/10* (2013.01)

(58) Field of Classification Search
CPC ..... H04L 63/062; H04L 63/10; H04L 9/0861; H04L 9/0894; H04L 9/3247
See application file for complete search history.

(56) References Cited

U.S. PATENT DOCUMENTS

| 2013/0129095 | A1* | 5/2013 | Fahrny | H04L 63/068 380/279 |
| 2018/0176187 | A1* | 6/2018 | Davis | H04L 63/0853 |
| 2018/0176193 | A1* | 6/2018 | Davis | H04L 63/06 |
| 2018/0329834 | A1* | 11/2018 | Grube | G06F 12/1408 |
| 2019/0164156 | A1* | 5/2019 | Lindemann | H04L 9/0825 |

* cited by examiner

*Primary Examiner* — Lynn D Feild
*Assistant Examiner* — Vladimir I Gavrilenko

(57) ABSTRACT

In view of the foregoing, an embodiment herein provides a method of generating and managing a key package using a key manufacturing server. The key manufacturing server performs the steps of: (i) obtaining a key package from a development signing server; (ii) generating at least one production key that is specific to a device in the key package; (iii) communicating the key package with the at least one production key to a key manager associated with the device using a communication link; and (iv) obtaining the key package with at least one device key that is generated by the key manager.

20 Claims, 10 Drawing Sheets

SYSTEM AND METHOD FOR GENERATING AND MANAGING A KEY PACKAGE

BACKGROUND

Technical Field

The embodiments herein generally relate to a key management platform, and, more particularly, to a system and method for encapsulating secure cryptographic key generation by communicating multiple sources (e.g. multi party key), transfer, and exchange mechanism using a key manufacturing server.

Description of the Related Art

Key generation is the process of generating keys in cryptography. A key is used to encrypt and decrypt whatever data is being encrypted/decrypted. A device or program used to generate keys is called a key manager. Key management is the management of cryptographic keys in a cryptosystem. The key management includes dealing with the generation, exchange, storage, use, crypto-shredding and replacement of keys. It includes cryptographic protocol design, key servers, user procedures, and other relevant protocols. Key management concerns keys either between users or systems, at the user level. Successful key management is critical to the security of a cryptosystem. Key exchange is any method in cryptography by which cryptographic keys are exchanged between two parties, allowing use of a cryptographic algorithm. If sender and receiver wish to exchange encrypted messages, each must be equipped to encrypt messages to be sent and decrypt messages received. The nature of the equipping they require depends on the encryption technique they might use. If the cipher is a symmetric key cipher, both will need a copy of the same key. If an asymmetric key cipher with the public/private key property, both sides (e.g. sender and receiver) will need the other's public key. Key exchange is a mechanism of copying keys from one device to another. Secure Key Exchange is a mechanism by which two or more devices securely exchange secret keys even if an opponent is monitoring that communication channel.

Existing systems use many cryptographic keys and related material for ensuring security. Each operating system layer, protocol, user, application, container, vendor, customer etc. associated with the system may have one or more cryptographic keys, passwords, cryptographic seeds, certificates, etc. to ensure security. Transporting the keys includes each piece of cryptographic material that has to be generated, transported, stored, and used as defined by the known protocols. However, there are some attributes that are not addressed by known protocols, for example, storage of keys using capabilities. The storage of keys is a major problem in most of the existing key management protocols as it is not defined and it is left to the implementation. Existing key management protocols do not specify where the keys are stored. Other attributes such as controlling key access are also not addressed by any of the existing key management protocols. Further, multi-party key generation, updates, and transportation are hard as the requests may require multiple parties to collaborate. Key storage is also not flexible to adapt to different classes of operating systems and hardware. In most of the existing systems, key transport protocols are very rigid. Further, the large number of keys required by the existing systems is also hard to manage and most manufacturers use very few keys or even skip the security requirements of the system. This may lead to large scale attacks due to default passwords, default keys, badly derived keys, reuse of the same key for different ciphers introducing weaknesses, or even the absence of keys.

Accordingly, there remains a need for a system and method for generating, transferring, exchanging one or more keys and storing one or more keys with meta information.

SUMMARY

In view of the foregoing, an embodiment herein provides a method of generating and managing a key package using a key manufacturing server. The key manufacturing server performs the steps of: (i) obtaining a key package from a development signing server; (ii) generating at least one production key that is specific to a device in the key package; (iii) communicating the key package with the at least one production key to a key manager associated with the device using a communication link; and (iv) obtaining the key package with at least one device key that is generated by the key manager. In an embodiment, the key package includes (a) at least one cryptographic key and (b) meta information associated with at least one each cryptographic key. In another embodiment, the at least one generated production key is stored in a database of the key manufacturing server. In yet another embodiment, the at least one device key associated with the key package is stored in the database.

In yet another embodiment, the key package is generated, using the development signing server, by (i) obtaining a basic key package with enumeration and description for a plurality of keys as required by a system from a source key manager, (ii) generating the plurality of development keys to support a plurality of devices, and (iii) obtaining (a) a cryptographic hash for ensuring integrity of the plurality of keys or (b) a key material for encrypting the plurality of keys. In yet another embodiment, each of the plurality of development keys is generated with unique slot number.

In yet another embodiment, the key manager of the device is configured to (i) extract the one or more cryptographic keys destined for the device based on the meta information associated with the key package, (ii) generate the at least one device key that is required for the device as described in the meta information associated with the key package, (iii) store the at least one device key as described in the meta information after encrypting the at least one device key, and (iv) update the key package with the at least one device key.

In yet another embodiment, the method further includes the step of updating, using the key manager of the device, the key associated with the key package with corresponding key updates. In yet another embodiment, the key updates includes at least one of (a) changes from the production key to operational key, (b) expired certificates, (c) addition of one or more new keys to the key package, (d) changes in password, (e) changes in shared secrets and (f) a symmetric cryptographic key.

In yet another embodiment, the production keys are generated using a key exchange algorithm running on the device and the key manufacturing server. In yet another embodiment, the production keys is a unique key that is specific to the device or a shared key that is specific to more than one device.

In yet another embodiment, the key exchange algorithm generates the production keys based on an authentication protocol/process between the device and the key manufacturing server.

In yet another embodiment, the key package includes a canonical description to provide access controls to the at least one cryptographic key through at least one of (a) a unique user identification code, (b) a container in which the at least one cryptographic key is stored (c) a process that is specific to access the at least one cryptographic key, (d) a type of access control or (e) destination information of the at least one cryptographic key. The canonical description comprises information to assign controls to a specific device to access the at least one cryptographic key through at least one of (a) a unique user identification code, (b) a container in which the at least one cryptographic key is stored (c) a process that is specific to access the at least one cryptographic key, (d) a type of access control or (e) destination information of the at least one cryptographic key.

In yet another embodiment, the method further includes the steps of (i) transmitting the access controls for the at least one cryptographic key to control access of the at least one cryptographic key by at least one of (a) applications, (b) containers or (c) users, and (ii) associating the at least one cryptographic key with a container to ensure isolation of the at least one cryptographic key. In yet another embodiment, the isolation of the cryptographic key is provided in the canonical description associated with the key package.

In yet another embodiment, the container is selected from at least one of (a) Linux containers, (b) a Java Virtual Machine container or (c) a Virtual Machine container that is used in the classical multiple operating systems.

In yet another embodiment, the at least one cryptographic key associated with the key package is stored in at least one of (a) files or store specific to an operating system (b) the device, (c) a workstation, (d) a container, (e) smart cards or (f) a server. In yet another embodiment, the at least one cryptographic key is stored with a mandatory access control or a discretionary access control configuration based on the meta information associated with the at least one cryptographic key at the key package.

In yet another embodiment, the key manufacturing server obtains the at least one production key that is stored in a database of the key manufacturing server or obtains the at least one production key including a root certificate or public certificate from a third party server instead of generating the at least one production key. In yet another embodiment, the root key is stored in the database of the key manufacturing server.

In yet another embodiment, the meta information associated with the key package includes but not limited to (a) a key name, (b) a key type, (c) a user name who creates the cryptographic key, (d) a container name where the at least one cryptographic key is stored, (e) a destination where the cryptographic key is stored, (f) device information that includes a serial number of the device, a public key, an ethernet or wireless ID and a device type of the device, (g) an access type associated with each cryptographic key, (h) certificate chains shared between devices and (i) cryptographic settings or security settings shared between the devices.

In yet another embodiment, the meta information is generated during an initial device setup for (a) managing secure communication of the device, (b) updating the keys of the key package, and (c) ensuring security of the keys of the key package.

In yet another embodiment, the key package is requested using the serial number of the device. In yet another embodiment, the serial number of the device is generated by a workstation associated with the device.

In yet another embodiment, the meta information of the at least one cryptographic key is extended to configure a Security-Enhanced Linux access control system to improve a security of the at least one cryptographic key.

In yet another embodiment, the method further includes the step of providing a user interface to create the description for each of the plurality of keys. In yet another embodiment, the user interface provides options to generate the key package with the description for each of the plurality of keys.

In another aspect, a system for generating and managing a key package is provided. The system includes a key manufacturing server that includes a memory that stores a database and a processor. The processor is configured to (i) obtain a key package from a development signing server, (ii) generate at least one production key that is specific to a device in the key package, (iii) communicate the key package with the at least one production key to a key manager associated with the device using a communication link, and (iv) obtain the key package with at least one device key that is generated by the key manager. In one embodiment, the key package includes (a) at least one cryptographic key and (b) meta information associated with at least one each cryptographic key. In another embodiment, the at least one generated production key is stored in a database of the key manufacturing server. In yet another embodiment, the at least one device key associated with the key package is stored in the database.

In yet another embodiment, the development signing server is configured to generate the key package by (i) obtaining a basic key package with enumeration and description for a plurality of keys as required by a system from a source key manager, (ii) generating the plurality of development keys to support a plurality of devices and (iii) obtaining (a) a cryptographic hash for ensuring integrity of the plurality of keys or (b) a key material for encrypting the plurality of keys. In yet another embodiment, each of the plurality of keys are generated with unique slot number.

In yet another embodiment, the system further includes an operation server that is configured to (i) obtain the key package from the key manufacturing server, (ii) update the key package with (a) newly generated keys that are generated based on a user request or (b) one or more key updates and (iii) communicate the key package to the key manager of the device. In yet another embodiment, the operation server receives a request from a user to (a) generate a new key or (b) update an existing key.

In yet another embodiment, the key manager of the device is configured to (i) extract the one or more cryptographic keys destined for the device based on the meta information associated with the key package, (ii) generate the at least one device key that is required for the device as described in the meta information associated with the key package, (iii) store the at least one device key as described in the meta information after encrypting the at least one device key, and (iv) update the key package with the at least one device key.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
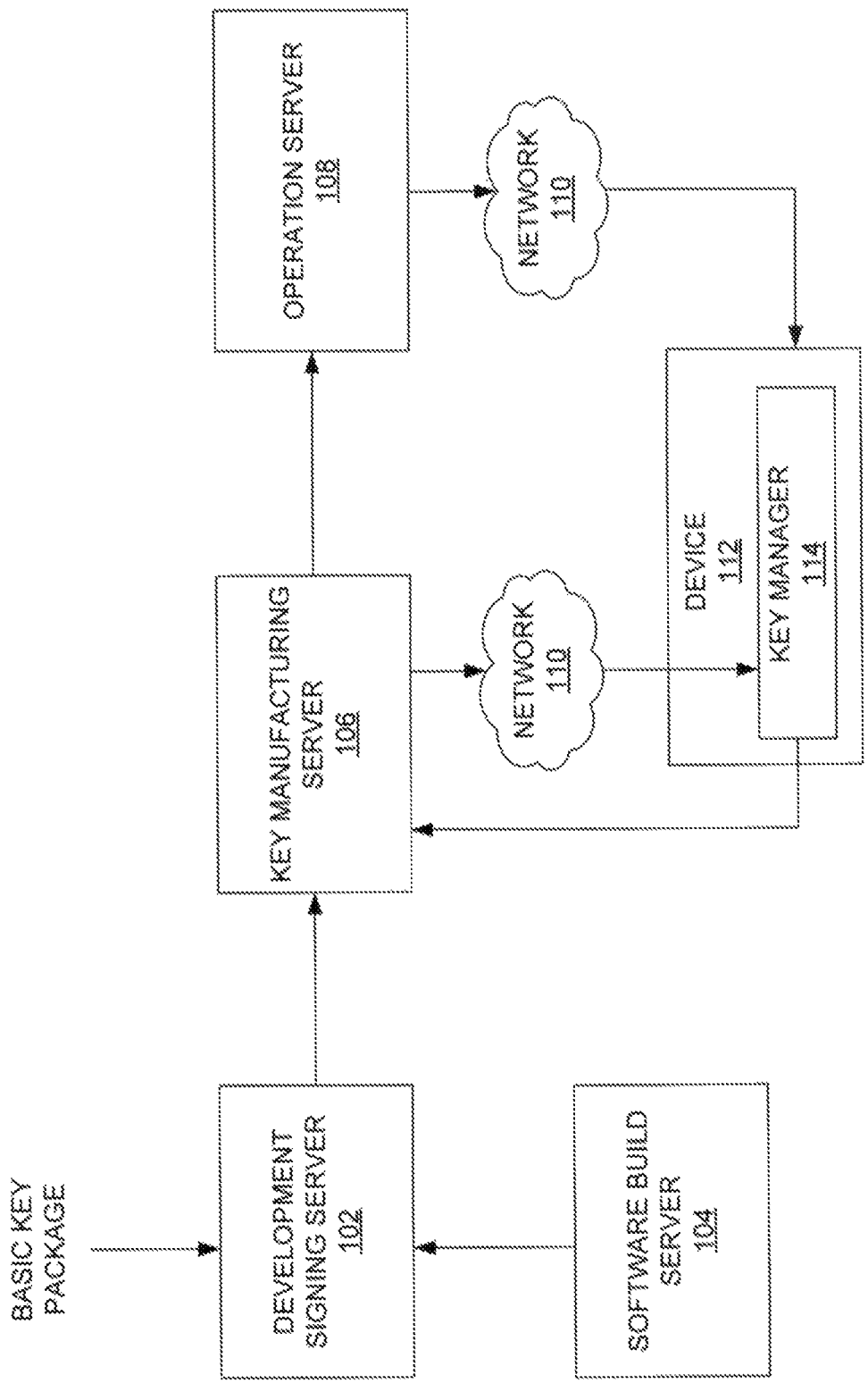
FIG. 1 illustrates a block diagram of a key management system according to an embodiment herein.

In the accompanying drawings, a number is employed to represent an item over which the number is positioned or an item to which the number is adjacent.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generating, transferring, exchanging one or more keys and storing the one or more keys with meta information without modifying applications, protocols and software packages. The embodiments herein achieve this by providing a key management system that communicates with one or more work stations, one or more servers and one or more IOT devices for managing a key package. The system includes protocols (e.g. secure management protocols) that are unique because of the specific requirements for generating a multi-party key, communicating keys between multiple devices and storing one or more keys with description.

The protocols are used for storing the one or more keys in a form accessible to applications such that the applications do not require modifications. The system can use an existing operating system that provides Access controls to protect the one or more keys from being stolen or misused. The system provides ability to deploy the one or more keys to containers and virtual machines to provision the one or more keys when new keys are spun up. The virtual machines are generally copied around and new instances are launched on demand. A virtual machine can be spun up a hundred times when each time the virtual machine is required or requested for generating unique keys. Referring now to the drawings, and more particularly to FIGS. 1 through 10, where similar reference characters denote corresponding features consistently throughout the figures, there are shown preferred embodiments.

FIG. 1 illustrates a block diagram of a key management system according to an embodiment herein. The block diagram includes a development signing server 102, a software build server 104, a key manufacturing server 106, an operation server 108, a network 110 and a device 112. The development signing server 102 obtains a basic key package with enumeration and description for one or more keys from a source key manager. The description associated with the one or more keys includes but not limited to (a) a key name, (b) container where each key needs to be stored, (c) key type, (d) algorithm, (e) key strength and (f) an application that can access the keys. In one embodiment, one or more applications can access the same key. The development signing server 102 generates one or more development keys to support one or more devices. A development key is defined as a key that is developed for testing purpose and to support the one or more devices. Each of the one or more keys is generated with a unique slot number, a serial number and a container name to differentiate from other keys. The software build server 104 delivers a firmware, a software, or a cryptographic hash to the development signing server 102. The development signing server 102 signs and encrypts the firmware or the software using a cryptographic key. In one embodiment, the development signing server 102 signs and encrypts the firmware or the software only if the cryptographic hash is obtained from the software build server 104.

The key package includes (a) at least one key and (b) meta information associated with at least one each key. The meta information associated with the key package includes but not limited to (a) key information that includes (i) a key name, (ii) a key type, (iii) specific algorithm that is used to generate a specific key, (iv) a key strength and size (e.g. ECC-256, ECC-512, AES-128, etc.) and key usage information (e.g. TLS usage), (b) user identification details (e.g. origin or requestor of the key), (c) a container name where the at least one key is stored, (d) a destination where the key is stored, (e) device information that includes a serial number of the device 112, a public key, an ethernet or a wireless ID and a type of the device 112, (f) an access type associated with each key, (g) certificate chains shared between devices and (h) cryptographic settings or security settings shared between the devices.

The meta information associated with the key package includes (a) a slot number, a serial number and a container name for each key, (b) an application that can access to particular keys, (c) usage text to identify each keys, (d) creator information that includes (i) imported from whom (e.g. vendor, partner, customer, applications, developers etc.), (ii) a key manager 114 on the device 112, (iii) key managers on servers, (iv) customer premises, (v) customer Hardware Security Module (HSM), (vi) unique ID of creator, (e) a time when a particular key is generated, (f) exported keys (e.g. exported public key, exported password, exported public and private key that are used for limited power devices and devices that does not have a RNG, etc.), (g) encryption details such as whether the key is encrypted or not, and a slot number, a serial number and a container name that is used to encrypt the key, (h) signing details such as whether the key is signed or not, a slot number, a serial number and a container name that is used to sign the key, and (i) access rights information such as whether any Unix style rights associated with key or not. In an embodiment, the key management system allows a set of keys together under a single encryption, or single signature scheme, or same destination, or same access rights etc.

The key package with fully validated structure is communicated to the key manufacturing server 106 over a communication link (e.g. the network 110). The key manufacturing server 106 generates at least one production key that is specific to the device 112 based on the meta information associated with the key package. In an embodiment, the production key is a key (e.g. an initial key) that is initially generated for a specific device (e.g. the device 112) based on the meta information associated with the key package. In one embodiment, the key manufacturing server 106 obtains at least one production key that is stored in a database or obtains at least one production key includes a root certificate or public certificate from a third party server instead of generating the at least one production key. The key manufacturing server 106 associates the at least one production key and the root certificate with the key package. In one embodiment, the key manufacturing server 106 stores the at least one production key and the root certificate in the database associated with the key manufacturing server 106. In one embodiment, the generation of the production key is a multi-step process between the device 112 and the key manufacturing server 106. The key manufacturing server 106 communicates the key package with the at least one production key to the key manager 114 associated with the device 112 using the communication link (e.g. the network 110).

The key manufacturing server 106 further encrypts the one or more keys. Once the one or more keys and the production key are encrypted to obtain one or more cryptographic keys, the key manufacturing server 106 generates a key package with the one or more cryptographic keys.

The key manager 114 of the device 112 (a) extracts the one or more cryptographic keys destined for the device 112 based on the meta information associated with the key package and (b) generates the at least one device key (e.g. a production key) that is required for the device 112 as described in the meta information associated with the key package. Further, the key manager 114 stores the at least one device key as described in the meta information after encrypting the at least one device key. The key package is updated by the key manager 114 with the at least one device key. The key manufacturing server 106 obtains the updated key package from the key manager 114 and communicates the updated key package to the operation server 108. The meta information and description associated with the key package is used to manage secure communication with the device 112, any firmware updates and device security keys. The operation server 108 again sends the key package to the key manager 114 of the device 112 for updating the one or more cryptographic keys associated with the key package with corresponding key updates. The key updates include at least one of (a) changes from the production key to operational key, (b) expired certificates, (c) addition of one or more new keys to the key package, (d) changes in password and (e) shared secret symmetric cryptographic key.

In an embodiment, the key package is requested using the part number, the serial number or the container name of the device 112. The part number, the serial number or the container name of the device 112 is generated by a workstation associated with the device 112. In one embodiment, the workstation is configured between the device 112 and the manufacturing server 106 (e.g. data path).

In one embodiment, the device 112 is at least one of server, router, etc. In another embodiment, the key manufacturing server 106 resides in a secure factory instead of residing in a cloud. In an embodiment, the secure factory is a workstation that comprises the one or more devices (e.g. IOT devices). In another embodiment, the secure factory is a main server that controls the one or more devices of the workstation.

The key management system provides a user interface to generate one or more keys and the meta information for the one or more keys. In one embodiment, the user interface provides option to generate the key package describing each key. The user interface allows the source key manager (e.g. a user) to create a basic template for creating keys (e.g. production keys, device keys etc.). In one embodiment, the user interface creates the basic key package using identifiers such as stock keeping unit (SKU), the device type etc. The key management system further provides a user interface to (a) import the one or more keys from the database or external servers, (b) enable signing and encryption of the key package and (c) sign and encrypt the key package based on the meta information associated with the key package. In one embodiment, the key package describes key information of the one or more keys and communicates the one or more keys around the key manufacturing server 106, the operation server 108 and the key manager 114 of the device 112.

Figure 2:
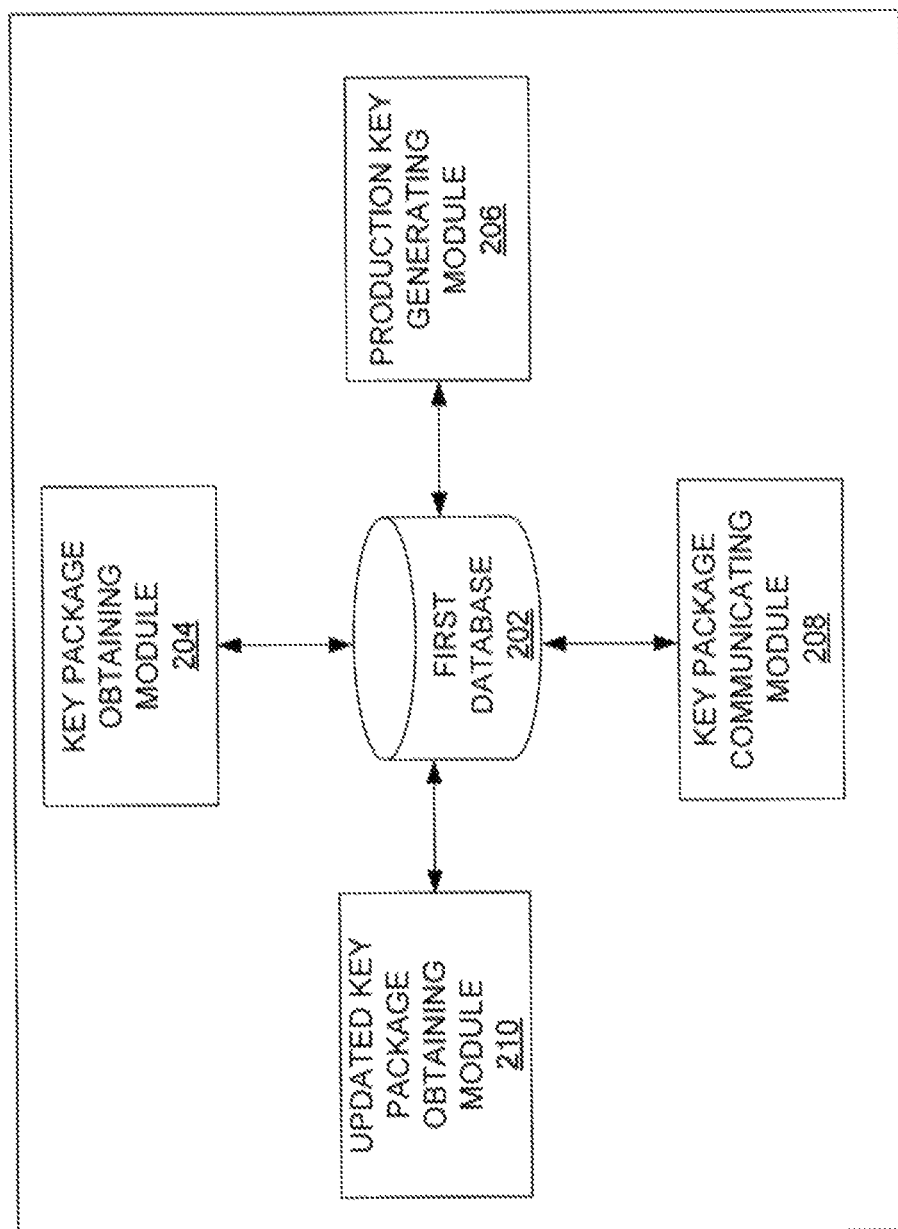
FIG. 2 illustrates an exploded view of a key manufacturing server of FIG. 1 according to an embodiment herein.

FIG. 2 illustrates an exploded view of the key manufacturing server 106 of FIG. 1 according to an embodiment herein. The exploded view of the key manufacturing server 106 includes a first database 202, a key package obtaining module 204, a production key generating module 206, a key package communicating module 208 and an updated key package obtaining module 210. The key package obtaining module 204 obtains the key package from the development signing server 102. The key package includes (a) at least one key and (b) the meta information associated with at least one each key. The production key generating module 206 generates at least one production key that is specific to the device 112 in the key package. In one embodiment, the production key is generated using a key exchange algorithm running on the device 112 and the key manufacturing server 106. The production keys may be a shared key that is specific to more than one device. In an embodiment, the key exchange algorithm generates the production keys based on an authentication protocol between the device and the key manufacturing server. The production key generating module 206 obtains at least one production key that is stored or obtains the root certificate from the third-party server. The at least one production key or the root certificate is stored in the first database 202 of the key manufacturing server 106. The key package communicating module 208 communicates the key package with the at least one production key to the key manager 114 of the device 112 using a communication link. In one embodiment, the key manufacturing server 106 encrypts the production key or the root certificate and the keys stored in the key package to obtain the one or more cryptographic keys.

The updated key package obtaining module 210 obtains the key package with at least one device key that is generated by the key manager 114. The first database 202 stores one or more key package, one or more production keys and one or more device keys. In one embodiment, the at least one device key associated with the key package is stored in a database of the device 112.

Figure 3:
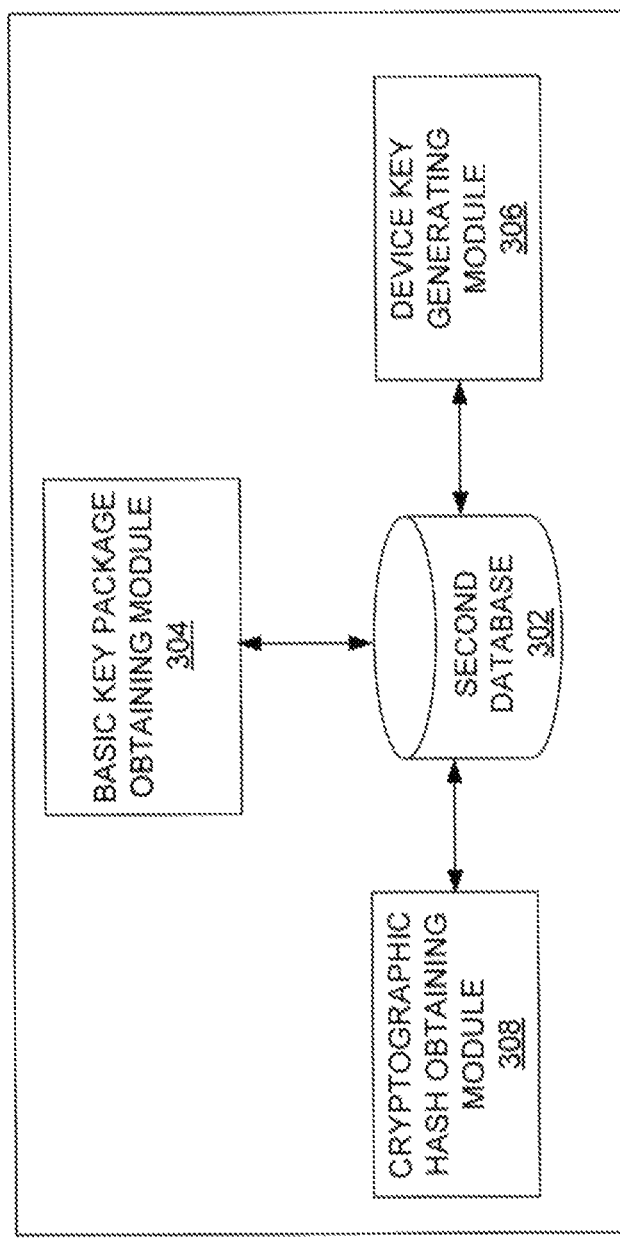
FIG. 3 illustrates an exploded view of a development signing server of FIG. 1 according to an embodiment herein.

FIG. 3 illustrates an exploded view of the development signing server 102 of FIG. 1 according to an embodiment herein. The exploded view of the development signing server 102 includes a second database 302, a basic key package obtaining module 304, a device key generating module 306 and a cryptographic hash obtaining module 308. The basic key package obtaining module 304 obtains the basic key package with enumeration and description for the one or more keys as required by the key management system from a source key manager. The device key generating module 306 generates one or more development keys to support one or more devices 112. Each of the development keys are generated with a unique slot number, a serial number and a container name. The cryptographic hash obtaining module 308 obtains a cryptographic hash for signing and encrypting the firmware or the software. The second database 302 stores one or more basic key package, one or more development keys and one or more cryptographic hashes for signing and encrypting the firmware or the software.

Figure 4:
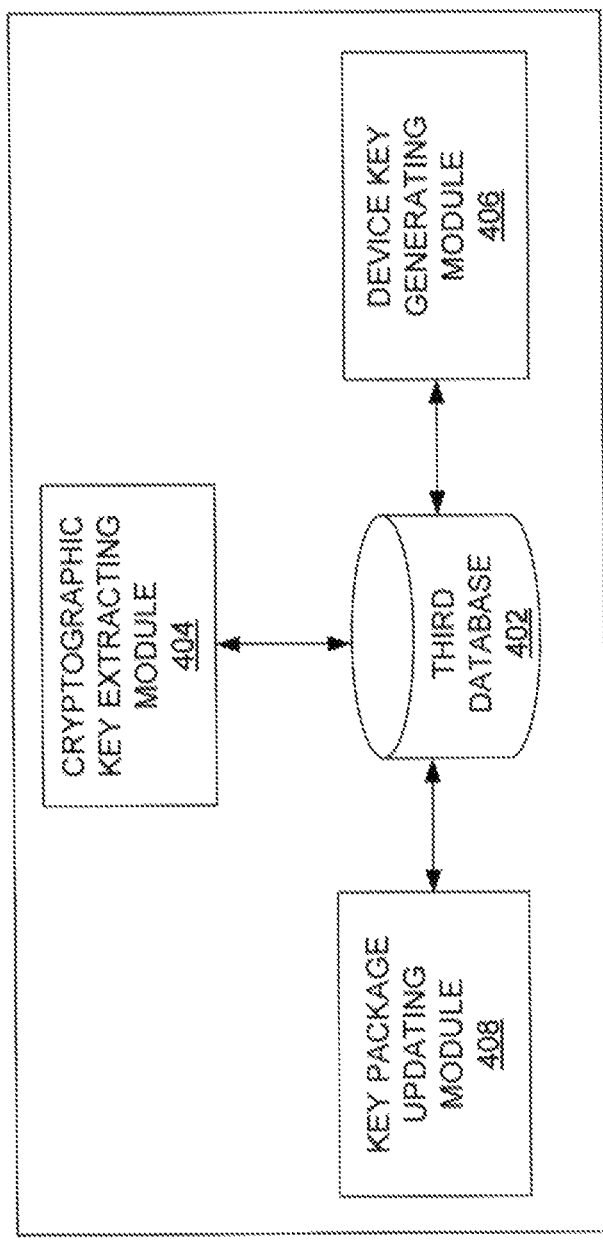
FIG. 4 illustrates an exploded view of a key manager of a device of FIG. 1 according to an embodiment herein.

FIG. 4 illustrates an exploded view of the key manager 114 of the device 112 of FIG. 1 according to an embodiment herein. The key manager 114 of the device 112 includes a third database 402, a cryptographic key extracting module 404, a device key generating module 406 and a key package updating module 408. The cryptographic key extracting module 404 receives the key package from the key manufacturing server 106 and extracts the one or more cryptographic keys destined for the device 112 based on the meta information associated with the key package. The device key generating module 406 (a) generates at least one device key that is required for the device 112 as described in the meta information associated with the key package and (b) stores the at least one device key as described in the meta information after encrypting the at least one device key. The key package updating module 408 updates the key package with the at least one device key. The third database 402 stores the one or more cryptographic keys and one or more device keys.

Figure 5:
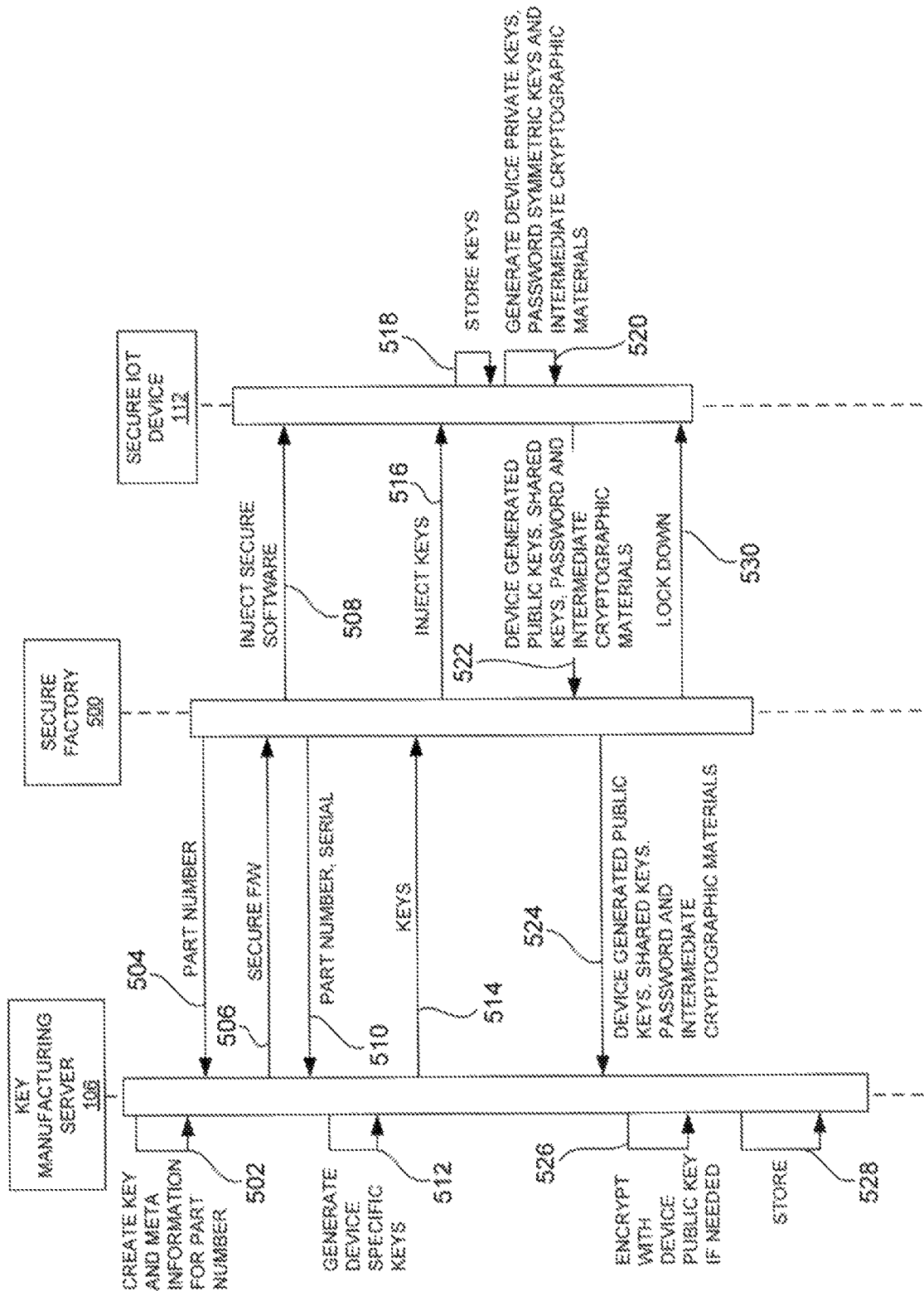
FIG. 5 illustrates an interaction diagram that shows a method of securing an IoT device (e.g. the device) using a key package along with a manufacturing cloud service and a secure work station according to an embodiment herein.

FIG. 5 illustrates an interaction diagram that shows a method of securing an IoT device (e.g. the device 112) using a key package along with a manufacturing cloud service and a secure work station according to an embodiment herein. At step 502, the key manufacturing server 106 generates at least one production key and the meta information including a specific device part number/unique slot number for the at least one production key in the key package. The key package further includes the meta information for at least one device key and one or more development keys. In one embodiment, the meta information is specific to a device type or a device part number. The key manufacturing server 106 populates the key package with public keys, private keys or symmetric keys for sharing between the devices. In one embodiment, the key manufacturing server 106 populates the key package for sharing certificate chains between the devices. For example, the certificate chain of Amazon cloud services is shared between the devices in order to authenticate Amazon cloud services. In another embodiment, the key manufacturing server 106 populates the key package for sharing cryptographic settings or security settings between the devices. For example, the cryptographic settings or security settings include information for locking the devices 112, unlocking the devices, etc.

At step 504, a secure factory 500 requests the signed and encrypted firmware or keys from the key manufacturing server 106. In one embodiment, the cryptographic key is identified by the device part number. In an embodiment, the production key that has to be encrypted or signed is specified to the part number associated with the specific production key. The key manufacturing server 106 signs the firmware and encrypts the keys based on the meta information associated with the key package. In one embodiment, the part number is an identifier used by factories to identify a device type. In an embodiment, the secure factory 500 includes one or more devices. At step 506, the key manufacturing server 106 communicates the signed firmware or encrypted keys to the secure factory 500. In one embodiment, the key manufacturing server 106 communicates the signed firmware or the encrypted keys to a specific device (e.g. the device 112). At step 508, the secure factory 500 injects the firmware into the device 112 (e.g. a secure IOT device). The firmware injection mechanism may vary based on the type of connection between the secure factory 500 (e.g. workstation) and the device 112. The connection may be through USB, Ethernet, serial, JTAG, etc. At step 510, the secure factory 500 (e.g. a secured workstation in the factory) requests a specific key package for the device 112 from the key manufacturing server 106 using the part number, the serial number or a container name of the device 112. In one embodiment, the serial number is generated by the secure factory 500 (e.g. workstation) or already associated with the device 112.

At step 512, the key manufacturing server 106 generates at least one production key (e.g. a device specific key) that is specific to the device 112 using a key exchange algorithm (e.g. Diffie-Hellman algorithm) running on the device 112 and the key manufacturing server 106. In one embodiment, the key package is updated by the key manufacturing server 106 with at least one production key when the production key is generated. At step 514, the key manufacturing server 106 communicates the key package to the secure factory 500. At step 516, the secure factory 500 injects the key package into the device 112.

At step 518, the keys associated with the key package are stored in the third database 402 of the device 112. In one embodiment, the keys are directly written in a flash memory. In one embodiment, the key manager 114 stores the keys appropriately in a secure way on the third database 402. At step 520, the device 112 generates device private keys, passwords, shared secrets, symmetric keys and intermediate cryptographic materials (e.g. Diffie-Hellman key material) that are required for the device 112 based on the meta information associated with the key package. The key manager 114 updates the key package with newly generated keys, passwords and intermediate cryptographic materials. At step 522, the device 112 communicates the key package with the device generated public keys, shared secrets, passwords, symmetric keys and intermediate cryptographic materials to the secure factory 500. In step 524, the secure factory 500 communicates the key package along with the device generated public keys, shared secrets, passwords, symmetric keys and intermediate cryptographic materials to the key manufacturing server 106. At step 526, the key manufacturing server 106 encrypts the device public keys in hardware security module (HSM) or other secures system. At step 528, the encrypted keys (e.g. cryptographic keys) are stored in the first database 202 associated with the key manufacturing server 106. At step 530, the secure factory 500 sends an acknowledgement to the device 112 to notify that the device 112 is secured using the encrypted key.

Figure 6:
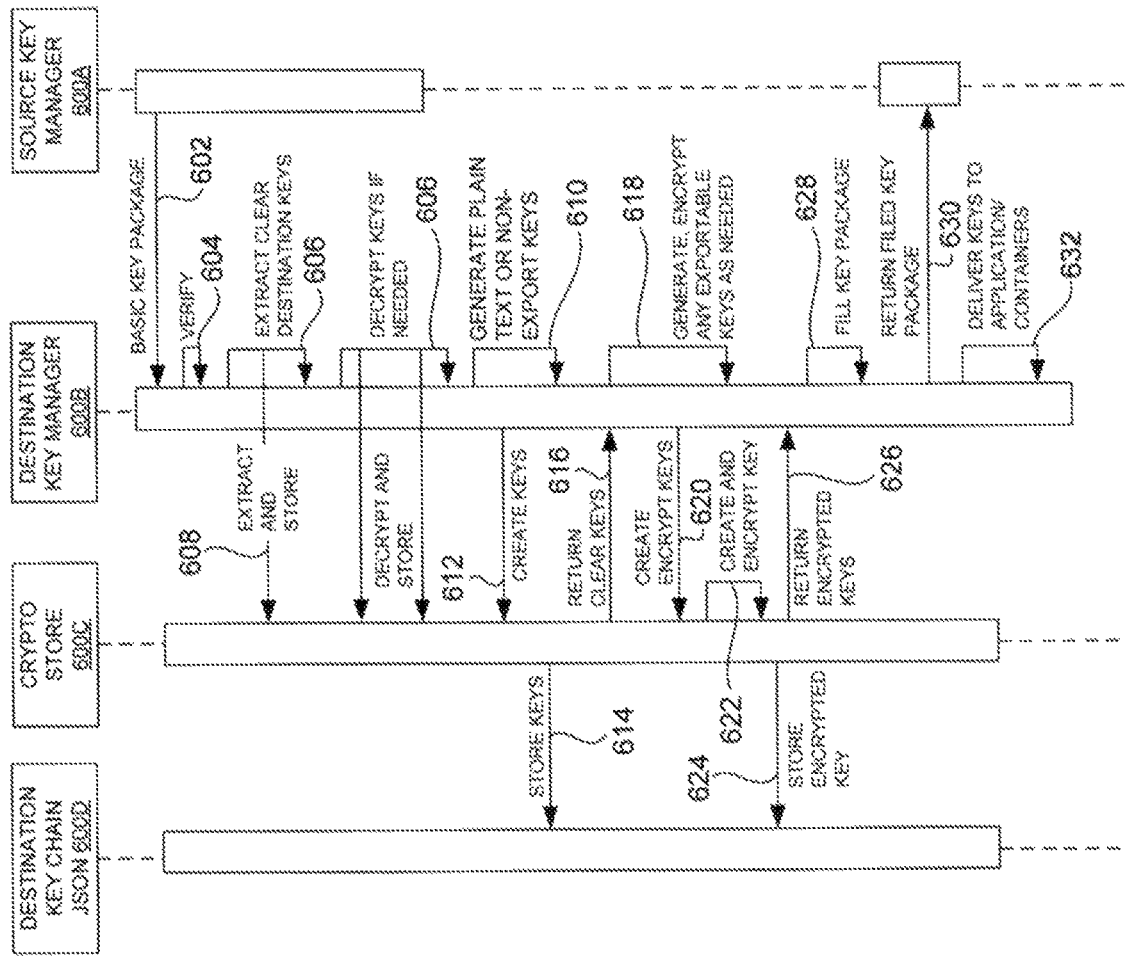
FIG. 6 illustrates an interaction diagram that shows a method of processing the key package according to an embodiment herein.

FIG. 6 illustrates an interaction diagram that shows a method of processing a key package according to an embodiment herein. At step 602, a source key manager 600A sends a basic key package to a destination key manager 600B (e.g. a key manager of the development signing server 102). In one embodiment, the source key manager 600A is present in a server. In another embodiment, the destination key manager 600B is at least one of a server, a device, etc. At step 604, the destination key manager 600B verifies whether the destination key manager 600B receives the key package or not. The destination key manager 600B verifies a format of the key package and signatures on the certificates in the key package. In one embodiment, the destination key manager 600B verifies an authenticity of a connection between the source key manager 600A and the destination key manager 600B. The authenticity of the connection may be verified when an authenticated connection is a Transport Layer Security (TLS). In an embodiment, the destination key manager 600B verifies if the destination of the TLS connection is the same as the destination (e.g. the destination key manager 600B) as described in the key package. The destination key manager 600B additionally verifies signatures on fields identified by key slots and the signatures on the certificates, etc. At step 606, the destination key manager 600B extracts destination keys (e.g. the destination keys that are destined for the key manager).

At step 608, the destination key manager 600B stores one or more keys in a crypto store 600C if a high security module (HSM) is used for security. In one embodiment, the destination key manager 600B stores the one or more keys in the crypto store 600C after encrypting the one or more keys. In another embodiment, the destination key manager 600B additionally decrypts the one or more keys using a secure mechanism like the HSM where the decryption key is protected by a hardware. At step 610, the destination key manager 600B generates plain text keys or non-export keys, symmetric keys and local keys. At step 612, the destination key manager 600B requests the crypto store 600C to generate device specific keys. At step 614, the crypto store 600C stores the device specific keys in the appropriate storage (e.g. a destination key chain 600D, e.g. JSON file). At step 616, the crypto store 600C returns the plain text keys to the destination key manager 600B.

At step 618, the destination key manager 600B generates one or more keys based on the meta information associated within the key package. At step 620, the destination key manager 600B sends the one or more keys to the crypto store 600C to encrypt the one or more keys. At step 622, the crypto store 600C creates and encrypts the one or more keys to obtain cryptographic keys. At step 624, the crypto store 600C stores the cryptographic keys in the appropriate storage (e.g. the destination key chain 600D, e.g. JSON file). At step 626, the crypto store 600C returns the encrypted keys/ cryptographic keys to the destination key manager 600B. At step 628, the destination key manager 600B updates the key package with the encrypted keys or plain text keys. At step 630, the destination key manager 600B communicates the updated key package to the source key manager 600A. At step 632, the destination key manager 600B delivers the one or more cryptographic keys to the applications/containers that are specific to each cryptographic key. In one embodiment, the destination key manager 600B stores the cryptographic keys in the respective containers with mandatory and/or discretionary access control based on meta information as described in the key package.

Figure 7:
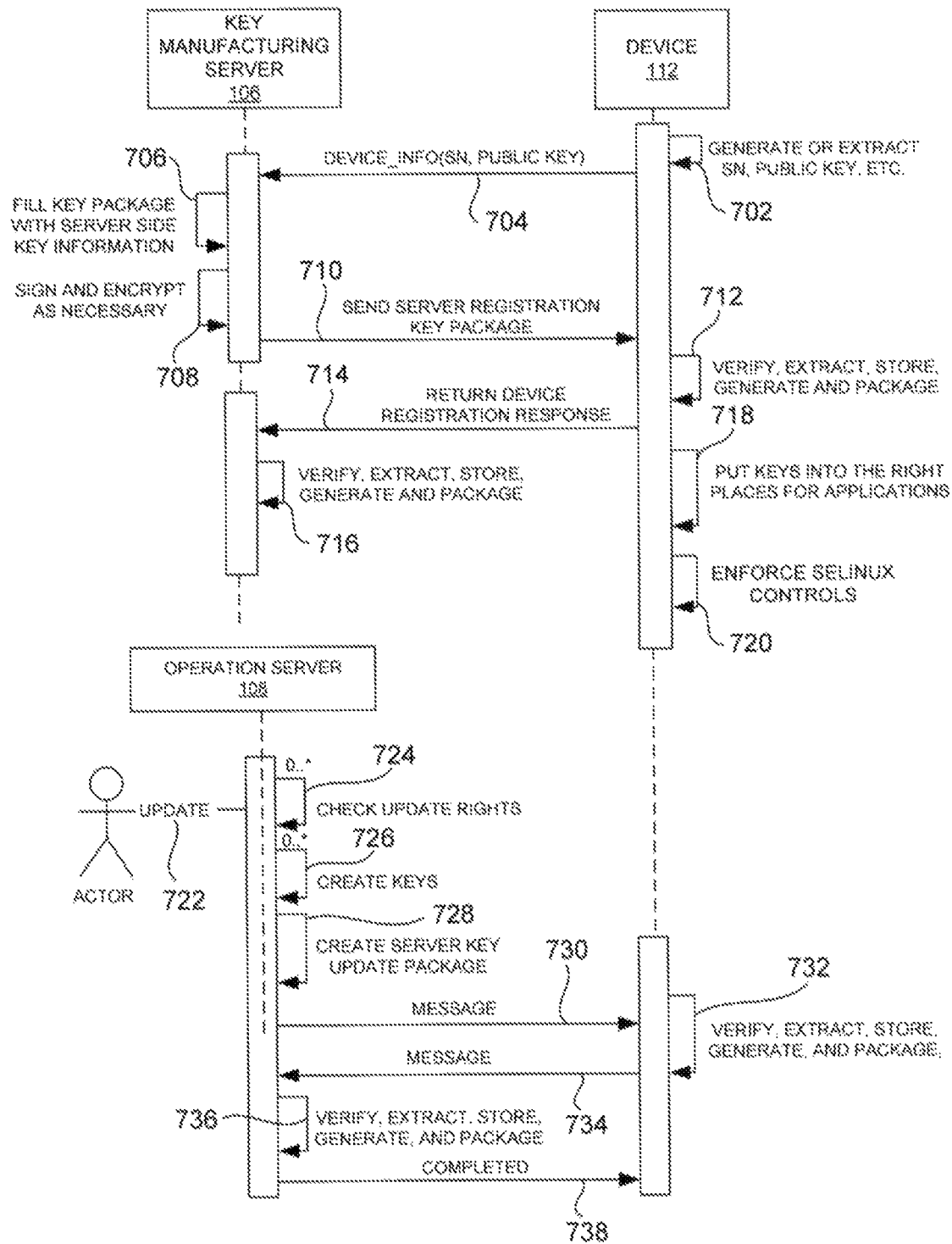
FIG. 7 illustrates an interaction diagram that describes how keys get injected in a device and then updated by an operation server according to an embodiment herein.

FIG. 7 illustrates an interaction diagram that describes how keys get injected in a device 112 and then updated by the operation server 108 according to an embodiment herein. At step 702, the device 112 generates or extracts serial number, public key, etc. The device 112 extracts the keys from the key package using the identification information such as (a) a serial number, (b) a public key (if the public key is already build with public private key), (c) Ethernet or Wi-Fi or MAC ID information and (d) a device type. At step 704, the device 112 communicates device information that is used to identify the device 112 to the key manufacturing server 106. The key manufacturing server 106 updates the key package by identifying the key that is specific to the device 112 based on the device information. In one embodiment, the device information includes serial number, public key and other identifying information such as ethernet or wireless or MAC ID. At step 706, the key manufacturing server 106 updates the key package with key information associated with a server. In one embodiment, the key package is updated with information that has to be filled in by the key manufacturing server 106. In another embodiment, the information to be filled in by the key manufacturing server includes but not limited to (a) Secure Shell (SSH) server keys, (b) server certificates (not private keys), (c) SSH public keys and (d) any intermediate result of a Diffie-Hellman key exchange. In yet another embodiment, the key package is updated with signer information, timestamps, etc. At step 708, the key manufacturing server 106 signs relevant fields (e.g. the fields where certificates are specified) or encrypts the one or more keys. In one embodiment, the key manufacturing server 106 encrypts the key package. At step 710, the key manufacturing server 106 sends the updated key package to the device 112.

At step 712, the device 112 verifies signatures, extracts relevant cryptographic materials including keys and security settings from the key package and encrypts the cryptographic materials based on the meta information as described in the key package. The device 112 generates new cryptographic materials based on the meta information and creates a new key package (e.g. a device registration response) by updating the new cryptographic materials and the encrypted cryptographic materials. At step 714, the updated key package is sent back to the key manufacturing server 106. At step 716, the key manufacturing server 106 further verifies signatures, extracts cryptographic materials including keys and security settings (e.g. that is generated in the device 112) from the key package and encrypts the cryptographic materials based on the meta information associated with the key package. The key manufacturing server 106 generates new cryptographic materials based on the meta information and updates the key package with the new cryptographic materials (e.g. that is generated in the key manufacturing server 106) and the encrypted cryptographic materials. At step 718, the device 112 deposits one or more cryptographic keys in right destination with access control permissions (e.g. a mandatory access control or a discretionary access control), so that the specific application can access the one or more cryptographic keys. At step 720, the device 112 enforces SELinux access controls to enables mandatory data access control. At step 722, a user requests the operation server 108 to update/generate the one or more keys. At step 724, the operation server 108 checks whether the user has access to update/generate the one or more keys or not. At step 726, the operation server 108 generates/ updates the one or more keys based on the user requests. In one embodiment, the operation server 108 generates the one or more keys when the user has the access to update/generate the one or more keys.

At step 728, the operation server 108 updates/generates the key package based on newly generated keys. At step 730, the operation server 108 sends the key package to the device 112. At step 732, the device 112 verifies signatures, extracts the cryptographic materials including keys and security settings from the key package and encrypts the cryptographic materials based on the meta information associated with the key package. The device 112 generates new cryptographic materials based on the meta information and updates the key package with the new cryptographic materials and encrypted cryptographic materials. In one embodiment, the key manager 114 processes the key package to verify, extract, generate the one or more keys and update the key package accordingly. At step 734, the device 112 sends the key package to the operation server 108. At step 736, the operation server 108 verifies signatures, extracts the cryptographic materials (e.g. generated by the device 112) including keys and security settings and encrypts the cryptographic materials based on the meta information associated with the key package. The operation server 108 generates new cryptographic materials based on the meta information and updates the key package with the new cryptographic materials and encrypted cryptographic materials. In one embodiment, a key manager of the operation server 108 processes the key package to verify, extract, generate the one or more keys and update the key package accordingly. At step 738, the operation server 108 sends an acknowledgement to the device 112 to notify that the key package update process is completed.

Figure 8:
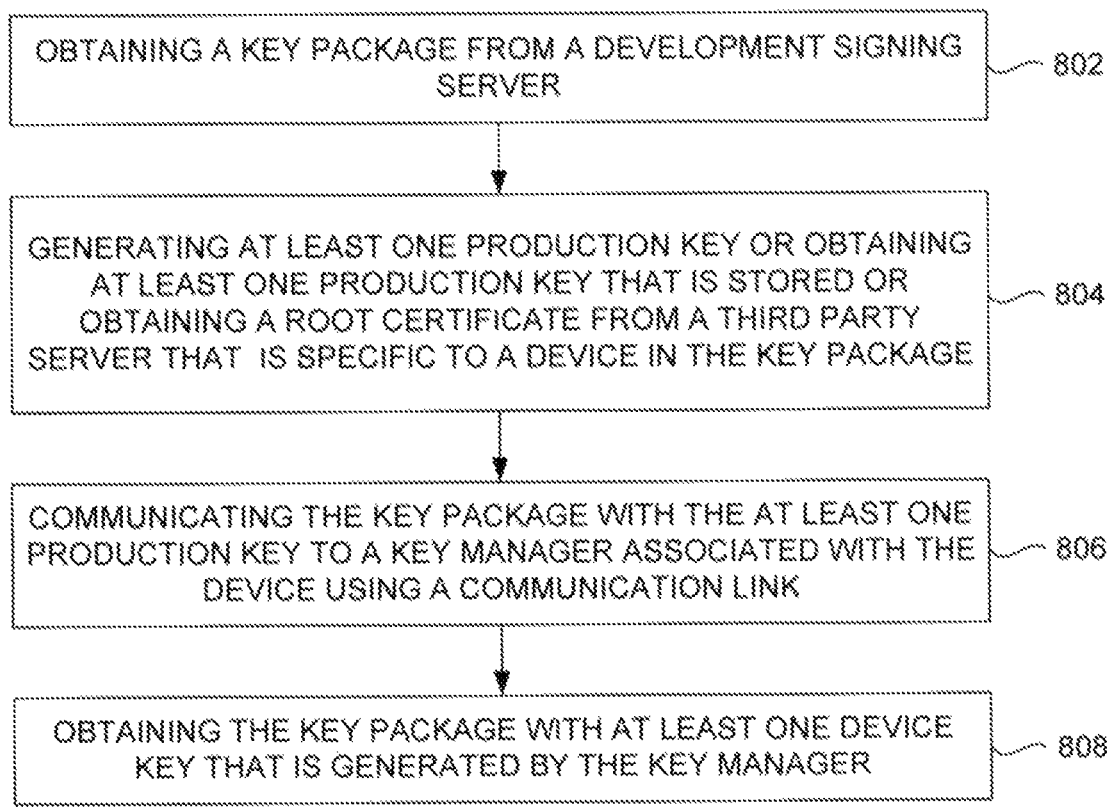
FIG. 8 is a flow diagram illustrating a method for managing the key package using the key manufacturing server of FIG. 1 according to an embodiment herein.

FIG. 8 is a flow diagram illustrating a method for managing the key package using the key manufacturing server 106 of FIG. 1 according to an embodiment herein. At step 802, the key package is obtained from the development signing server 102. The key package includes (a) at least one key and (b) the meta information associated with at least one each key. At step 804, at least one production key is generated by the key manufacturing server 106 that is specific to the device 112. In one embodiment, the at least one production key is obtained from the first database 202 that is specific to the device 112. In another embodiment, the at least one production key is obtained from a third-party server that is specific to the device 112. In yet another embodiment, the at least one generated production keys is stored in the first database 202 of the key manufacturing server 106. At step 806, the key package with the at least one production key is communicated to the key manager 114 of the device 112 using the communication link. At step 808, the key package with at least one device key that is generated by the key manager 114 is obtained by the key manufacturing server 106. The at least one device key associated with the key package is stored in the first database 202.

Figure 9:
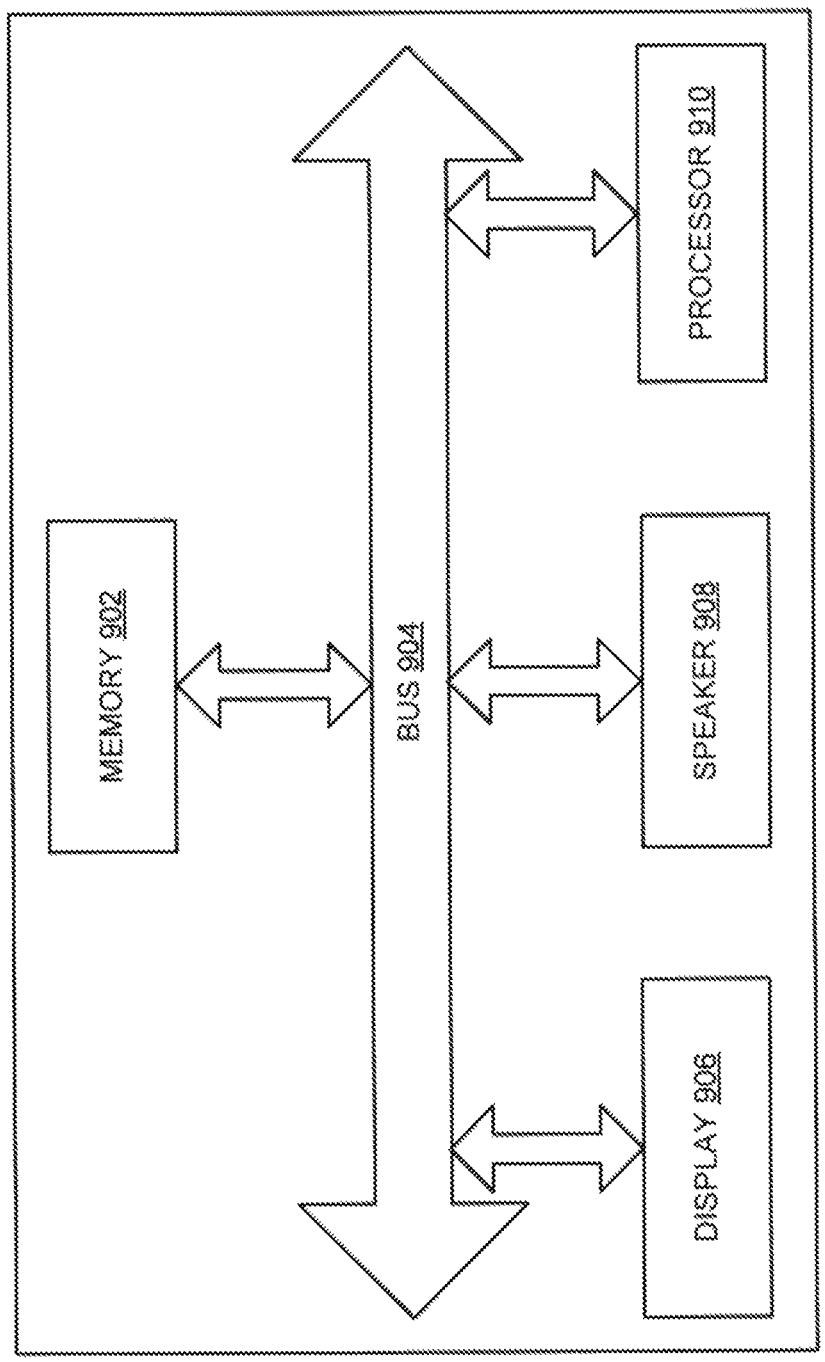
FIG. 9 illustrates an exploded view of a communication device according to the embodiments herein.

FIG. 9 illustrates an exploded view of the personal communication device having a memory 902 having a set of computer instructions, a bus 904, a display 906, a speaker 908, and a processor 910 capable of processing a set of instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. The memory 902 may also store program specific information and/or service information (PSI/SI), including information about digital content (e.g., the detected information bits) available in the future or stored from the past. A user of the personal communication device may view this stored information on display 906 and select an item of for viewing, listening, or other uses via input, which may take the form of keypad, scroll, or other input device(s) or combinations thereof. When digital content is selected, the processor 910 may pass information. The content and PSI/SI may be passed among functions within the personal communication device using the bus 904.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
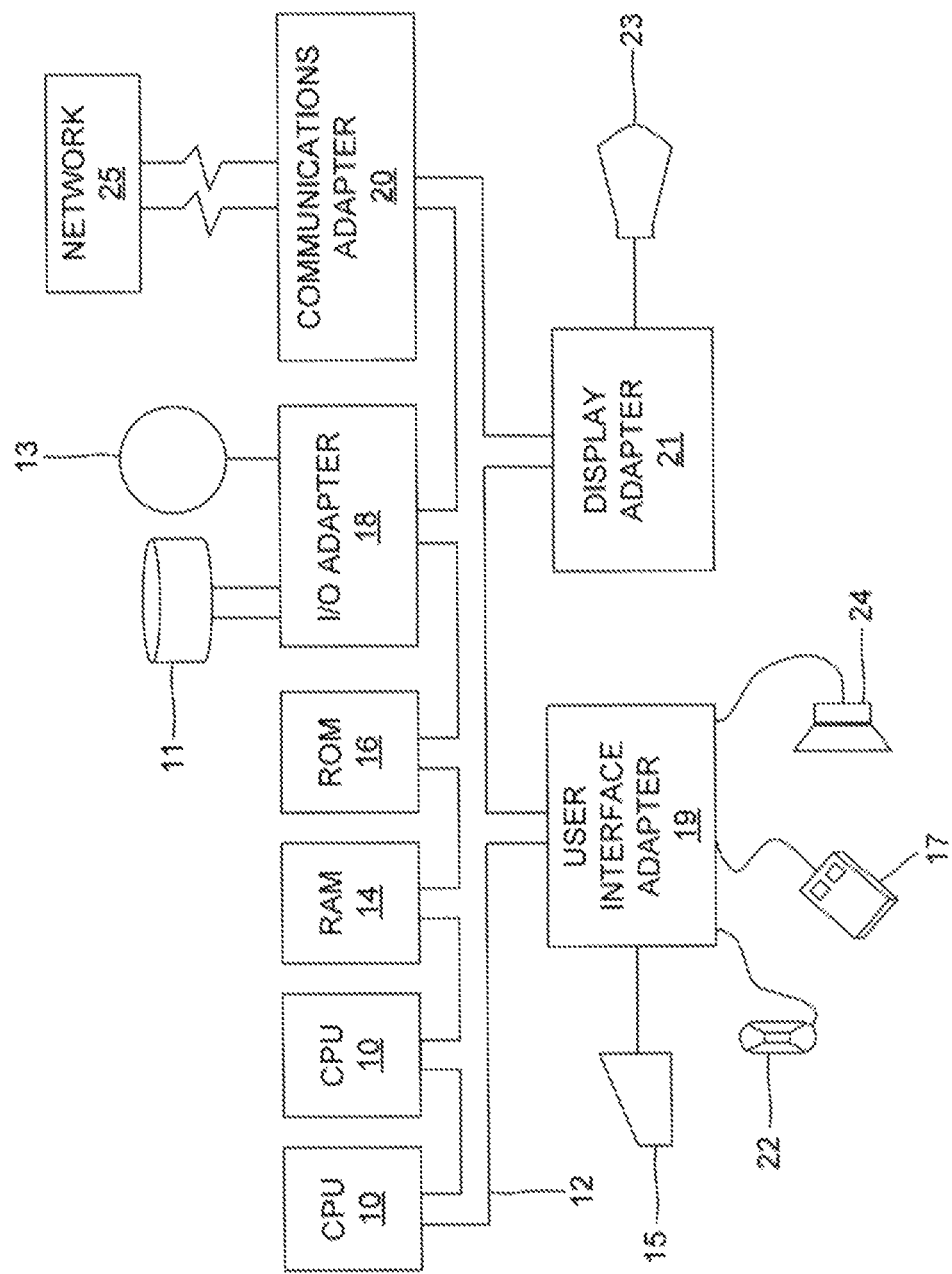
FIG. 10 is a schematic diagram of computer architecture used in accordance with the embodiment herein.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of generating and managing a key package using a key manufacturing server, comprising:

obtaining a key package from a development signing server, wherein said key package comprises (a) at least one key and (b) meta information associated with at least one key;

generating at least one production key that is specific to a device in said key package, wherein said at least one production key is generated using a key exchange algorithm running on said device and said key manufacturing server, wherein said at least one production key is encrypted based on the meta information associated with the key package to obtain at least one cryptographic key;

communicating said key package with said at least one production key to a key manager of said device using a communication link; and obtaining said key package with at least one device key that is generated by said key manager, wherein said key manager generates said at least one device key that is required for said device as described in said meta information associated with said key package by executing an algorithm as required by key description destined for said device based on said meta information associated with said key package.

2. The method of claim 1, wherein said key package is generated, using said development signing server, by obtaining a basic key package with enumeration and description for a plurality of keys as required by a system from a source key manager;

generating said plurality of development keys to support a plurality of devices, wherein each of said plurality of development keys are generated with unique slot number, a serial number and metadata for each key; and obtaining (a) a cryptographic hash for ensuring integrity of the plurality of keys or (b) a key material for signing and encrypting a firmware or a software.

3. The method of claim 1, wherein said key manager of said device is configured to extract said one or more cryptographic keys destined for said device based on said meta information associated with said key package;

store said at least one device key as described in said meta information after encrypting said at least one device key; and update said key package with said at least one device key.

4. The method of claim 1, further comprising updating, using said key manager of said device, said key associated with said key package with corresponding key updates, wherein said key updates comprises at least one of (a) changes from said production key to operational key, (b) expired certificates, (c) addition of one or more new keys to said key package, (d) changes in password, (e) changes in shared secrets and (f) a symmetric cryptographic key.

5. The method of claim 1, wherein said at least one production keys is a unique key that is specific to said device or a shared key that is specific to more than one device.

6. The method of claim 5, wherein said key exchange algorithm generates said production keys based on an authentication protocol between said device and said key manufacturing server.

7. The method of claim 1, wherein said key package comprises a canonical description to provide access controls to said at least one cryptographic key through at least one of (a) an unique user identification code, (b) a container in which said at least one cryptographic key is stored (c) a process that is specific to access said at least one cryptographic key, (d) a type of access control or (e) destination information of the at least one cryptographic key.

8. The method of claim 7, further comprising
transmitting said access controls for said at least one cryptographic key to control access of said at least one cryptographic key by at least one of (a) applications, (b) containers or (c) users; and
associating said at least one cryptographic key with a container to ensure isolation of said at least one cryptographic key, wherein said isolation of said cryptographic key is provided in said canonical description associated with said key package.

9. The method of claim 7, wherein said container is selected from at least one of (a) Linux containers, (b) a Java Virtual Machine container or (c) a Virtual Machine container that is used in the classical multiple operating systems.

10. The method of claim 1, wherein said at least one cryptographic key associated with said key package is stored in at least one of (a) files or store specific to an operating system (b) said device, (c) a workstation, (d) a container, (e) smart cards or (f) a server, wherein said at least one cryptographic key is stored with a mandatory access control or a discretionary access control configuration based on said meta information associated with said at least one cryptographic key at said key package.

11. The method of claim 1, wherein said key manufacturing server obtains said at least one production key that is stored in a database of said key manufacturing server or obtains a production key comprising a root certificate or public certificate from a third party server instead of generating said at least one production key, wherein said root key is stored in said database of said key manufacturing server.

12. The method of claim 1, wherein said meta information associated with said key package comprises but not limited to (a) a key name, (b) a key type, (c) a user name who creates said cryptographic key, (d) a container name where said at least one cryptographic key is stored, (e) a destination where said cryptographic key is stored, (f) device information that comprises a serial number of said device, a public key, an ethernet or wireless ID and a device type of said device, (g) an access type associated with each cryptographic key, (h) certificate chains shared between devices and (i) cryptographic settings or security settings shared between said devices.

13. The method of claim 12, wherein said meta information is generated during an initial device setup for (a) managing secure communication of said device, (b) updating said keys of said key package, and (c) ensuring security of said keys of said key package.

14. The method of claim 12, wherein said key package is requested using said serial number of said device, wherein said serial number of said device is generated by a workstation associated with said device.

15. The method of claim 1, wherein said meta information of said at least one cryptographic key is extended to configure a Security-Enhanced Linux access control system to improve a security of said at least one cryptographic key.

16. The method of claim 2, further comprising
providing a user interface to create said description for each of said plurality of keys, wherein said user interface provides options to generate said key package with said description for each of said plurality of keys.

17. A system for generating and managing a key package, wherein said system comprises:
a development signing server comprising:
a processor that is configured to
obtaining a basic key package with enumeration and description for a plurality of keys as required by a system from a source key manager; and
generating a plurality of development keys to support a plurality of devices and updating said plurality of development keys to said basic key package to obtain a key package, wherein each of said plurality of keys are generated with unique slot number;
a key manufacturing server comprising:
a processor that is configured to
obtain said key package from said development signing server, wherein said key package comprise (a) at least one key and (b) meta information associated with at least one each key;
generate at least one production key that is specific to a device in said key package, wherein said at least one production key is generated using a key exchange algorithm running on said device and said key manufacturing server, wherein said at least one production key is encrypted based on the meta information associated with the key package to obtain at least one cryptographic key; and
communicate said key package with said at least one production key to said device using a communication link; and
a key manager associated with said device, wherein said key manager is configured to
generate at least one device key that is required for said device as described in said meta information associated with said key package by executing an algorithm as required by key description destined for said device based on said meta information associated with said key package;
store said at least one device key as described in said meta information after encrypting said at least one device key; and
update said key package with said at least one device key.

18. The system of claim 17, wherein said development signing server is configured to generate said key package by
obtaining a cryptographic hash from a software build server for signing and encrypting a firmware or a software.

19. The system of claim 17, wherein said system further comprises:
an operation server that is configured to
obtain said key package from said key manufacturing server;
update said key package with (a) newly generated keys that are generated based on a user request or (b) one or more key updates, wherein said operation server receives a request from a user to (a) generate a new key or (b) update an existing key; and
communicate said key package to said key manager of said device.

20. The system of claim 17, wherein said key manufacturing server further configured to
store said key package in said database associated with said key manufacturing server with said at least one device key that is generated by said key manager associated with said device, wherein said at least one device key associated with said key package is stored in said database.

* * * * *